UNITED STATES PATENT OFFICE.

CARLETON ELLIS, OF MONTCLAIR, NEW JERSEY, ASSIGNOR TO NATIONAL CARBON COMPANY, INC., OF NEW YORK, N. Y., A CORPORATION OF NEW YORK.

BLACK-STREAK-MANGANESE-DIOXID DEPOLARIZING AGENT.

1,289,707.     Specification of Letters Patent.     Patented Dec. 31, 1918.

No Drawing.     Application filed October 2, 1917. Serial No. 194,422.

*To all whom it may concern:*

Be it known that I, CARLETON ELLIS, a citizen of the United States, and a resident of Montclair, in the county of Essex and State of New Jersey, have invented certain new and useful Improvements in Black-Streak - Manganese - Dioxid Depolarizing Agent, of which the following is a specification.

This invention discloses a process of making what may be termed "black streak" manganese dioxid and is especially concerned with the production of this material from a solution of a manganese salt by the action of chlorin thereon.

It is possible to produce manganese dioxid of a deep black color and of good conducting quality, in a desirably hydrated condition, by treatment of manganous sulfate in slightly acid solution with sodium hypochlorite. The preparation of hypochlorite for this purpose involves some expense and complications. In the present case I make use of chlorin gas instead, treating a solution of, for example, manganous sulfate in water with the chlorin gas preferably at the boiling point of water, or in some cases at even higher temperatures, in order to produce the manganese dioxid material.

In the preparation of a higher oxid of manganese such as manganese dioxid, I preferably start with a cheap salt of manganese such as manganous sulfate, although the chlorid, nitrate or other salt, may be used if desired. The manganous sulfate is placed in solution and brought to the boiling point, while chlorin is introduced. Black manganese dioxid or some similar higher oxid of manganese forms and is precipitated. This may be removed from time to time by filtration. As the solution increases in acid strength due to liberation of sulfuric acid, requisite quantities of an alkali may be added to neutralize the excess of acid. In some cases the reaction may be carried out in slightly acid solution, say 2% to 5% strength, in which case a desirable deep black product having good electrical conductivity and of a good degree of hydration may be obtained. Preferably an acid strength of over 10% is not exceeded. Considerable difficulty exists in securing manganese dioxid of a high oxygen content, closely approximating the formula $MnO_2$, which does not cause local action in dry batteries when used as a depolarizing agent. Practical results show the deeper black the dioxid can be produced, the better, as a rule, are the qualities of this material as a depolarizing agent. Many of the so-called manganese dioxids, produced in a variety of ways, although in bulk apparently black in color, will be found to give a streak on porcelain or white paper which has a brownish cast, sometimes strongly brown. In the present case a product is obtained which gives a dead black streak without suggestion of brown, showing that the conversion of the manganese sulfate to a true deep black product has been effectively accomplished by the simple method of treatment with chlorin, avoiding the use of hypochlorite salts.

If in preparing the black streak hydrate, it is desired to raise the boiling point above 100° C. the addition of saline bodies such as sodium sulfate or chlorin may be made to raise the boiling point several degrees. In this way it may be possible to carry on the chlorin treatment at a temperature, of say, 105° C. or 108° C. instead of at the normal boiling point of water.

The actual strengths of the manganese salt solution which is subjected to chlorin treatment may be varied from weak concentrations of say 5–10% strength to highly concentrated solutions.

When manganese dioxid forms in saline solution there is always some chance of formation of double salts or compounds of manganese with bases, manganites, etc. With an oxidizing agent such as sodium hypochlorite, or with salts such as noted above for raising the boiling point, this possibility of forming complex manganites always exists and in the preferred form of the invention no saline body is present. For example, using simply manganous sulfate, water, sulfuric acid and chlorin gas, the possibility of formation of complex mixed manganites is excluded.

In the production of manganese dioxid depolarizing agents to which end the invention is especially directed, it is important to produce a product of high purity, as free as reasonably possible from extraneous matter which would tend to cause local action in a battery, especially a battery of the Leclanche type. As the process of the present invention does not necessarily require the introduction of, or presence of saline matter or other materials foreign to the product except the very simple reagents named, that is, the chlorin and any acidulating body, the procedure affords a method of obtaining the dioxid directly of a high purity, but if for any reason impurities are present as a result of modifications of the method the product may be boiled with dilute nitric acid to extract soluble salts, etc., and then washed and dried. The process affords a means of making manganese dioxid from the depolarizing material present in spent dry batteries. The manganese material of this waste product may be dissolved in acid and treated with chlorin to give the black streak manganese dioxid suitable for depolarizing purposes. Thus from the waste material there is obtained a valuable form of manganese dioxid.

In the treatment of a manganous salt solution with chlorin it is best to use a deep column of the liquid in order to secure good contact with the chlorin and agitators may be used to assist the action, or preferably the chlorin is allowed to bubble through a series of containers such as acid absorbing bonbons, the solution in these preferably being maintained at or near the boiling point. In this way the chlorin is utilized in sufficiently complete manner. This procedure forms a part of the present invention.

What I claim is:—

1. The process of producing manganese dioxid material having a dead black streak which comprises exposing manganous sulfate in aqueous solution at a temperature near the boiling point of water to the action of free chlorin; said solution having a degree of acidity below 10%.

2. The process of producing manganese dioxid material having a black streak which comprises exposing a manganous salt in hot aqueous acid solution to the action of chlorin; said solution having a degree of acidity below 10%.

3. The process of producing manganese dioxid material having a deep black streak which comprises exposing manganous sulfate in aqueous solution at about the boiling point of water to the action of chlorin in the absence of salts of hypochlorous acid; said solution having a degree of acidity below 10%.

4. The process of producing black hydrated higher oxid of manganese which comprises exposing a hot solution containing a compound of manganese of a lower stage of oxidation, to the action of chlorin; whereby said higher oxid of manganese is formed and is collected; said solution having a degree of acidity below 10%.

5. The process of producing manganese dioxid material having a deep black streak which comprises exposing a manganous salt in aqueous solution at about the boiling point of water to the action of chlorin; said solution having a degree of acidity below 10%.

6. In the process of making depolarizing material containing manganese dioxid, the step which comprises exposing a compound of manganese in a lower stage of oxidation to the action of chlorin; whereby the material is converted into a higher oxid of manganese, and in washing the product substantially free from bodies tending to cause local action in a dry battery of the Leclanche type; said solution having a degree of acidity below 10%.

CARLETON ELLIS.